United States Patent [19]

James, deceased

[11] 4,368,416

[45] Jan. 11, 1983

[54] THERMIONIC-THERMOELECTRIC GENERATOR SYSTEM AND APPARATUS

[75] Inventor: Jasper L. James, deceased, late of Greeneville, Tenn., by James I. Dye, administrator

[73] Assignee: James Laboratories, Inc., Greenville, Tenn.

[21] Appl. No.: 235,954

[22] Filed: Feb. 19, 1981

[51] Int. Cl.³ .............................................. H02N 3/00
[52] U.S. Cl. .................. 322/2 R; 310/306; 136/205
[58] Field of Search ................ 310/306; 136/200, 202, 136/204, 220, 205; 322/2

[56] References Cited

U.S. PATENT DOCUMENTS

| | | | |
|---|---|---|---|
| 2,510,397 | 6/1950 | Hansell | 310/306 X |
| 2,813,242 | 11/1957 | Crump . | |
| 2,881,384 | 4/1959 | Durant . | |
| 3,018,430 | 1/1962 | Pack . | |
| 3,050,684 | 8/1962 | Sclar . | |
| 3,079,527 | 2/1963 | Opfermann . | |
| 3,119,059 | 1/1964 | Hall et al. . | |
| 3,161,786 | 12/1964 | Gunther | 310/306 X |
| 3,175,105 | 3/1965 | Creedon et al. . | |
| 3,189,765 | 6/1965 | Danko et al. | 310/306 |
| 3,201,618 | 8/1965 | Coleman | 310/306 |
| 3,202,843 | 8/1965 | Hurst | 310/306 |
| 3,254,244 | 5/1966 | Gottlieb et al. . | |
| 3,258,616 | 6/1966 | Martini . | |
| 3,273,048 | 9/1966 | Hoff et al. . | |
| 3,286,107 | 11/1966 | Feinn et al. . | |
| 3,322,979 | 5/1967 | Clendinning et al. . | |
| 3,329,532 | 7/1967 | Austin et al. . | |
| 3,329,885 | 7/1967 | Gabor et al. | 322/2 |
| 3,365,653 | 1/1968 | Gabor et al. . | |
| 3,373,339 | 3/1968 | Birman . | |
| 3,384,806 | 5/1968 | Hartman | 322/2 |
| 3,402,074 | 9/1968 | Chapman et al. . | |
| 3,430,079 | 2/1969 | Danko et al. | 310/306 |
| 3,477,012 | 11/1969 | Laing . | |
| 3,519,854 | 7/1970 | Davis . | |
| 3,548,222 | 12/1970 | Hobson . | |
| 3,578,991 | 5/1971 | Gross et al. | 310/306 |
| 3,578,991 | 5/1971 | Gross . | |
| 3,601,638 | 8/1971 | Busse et al. . | |
| 3,719,532 | 3/1973 | Falkenberg et al. . | |
| 3,740,592 | 6/1973 | Engdahl et al. . | |
| 3,818,304 | 6/1974 | Hursen et al. . | |
| 3,843,896 | 10/1974 | Rasor et al. . | |
| 3,863,081 | 1/1975 | Jules et al. . | |
| 4,014,713 | 3/1977 | Markman et al. . | |
| 4,020,368 | 4/1974 | Carney . | |
| 4,023,088 | 5/1977 | Fowler . | |
| 4,127,804 | 11/1978 | Breaux . | |
| 4,199,713 | 4/1980 | Förster | 322/2 |

Primary Examiner—Donovan F. Duggan
Attorney, Agent, or Firm—Luedeka, Fitch & Neely

[57] ABSTRACT

Apparatus is disclosed including a compact thermionic generator formed with an outer cathode cylinder and an axially concentric inner anode cylinder. The cylinders are sealed and evacuated and provided with external electrical connections leading to the cathode and anode cylinders. A thermoelectric generator formed of a folded length of thermocouples is nested within the anode cylinder with respective ends thermally and electrically coupled to the cathode and anode cylinders. Sufficient heat applied to the outer cylinder causes the thermionic emission from the cathode to anode cylinders to be enhanced by the positive potential applied to the anode cylinder from the internal thermoelectric generator which is also responsive to the applied heat to generate the positive potential relative to the potential of the cathode cylinder. A generator system is also disclosed in which a pair of these generators is interconnected by a solid state switching circuit to an output load via intermediate charging capacitors.

7 Claims, 6 Drawing Figures

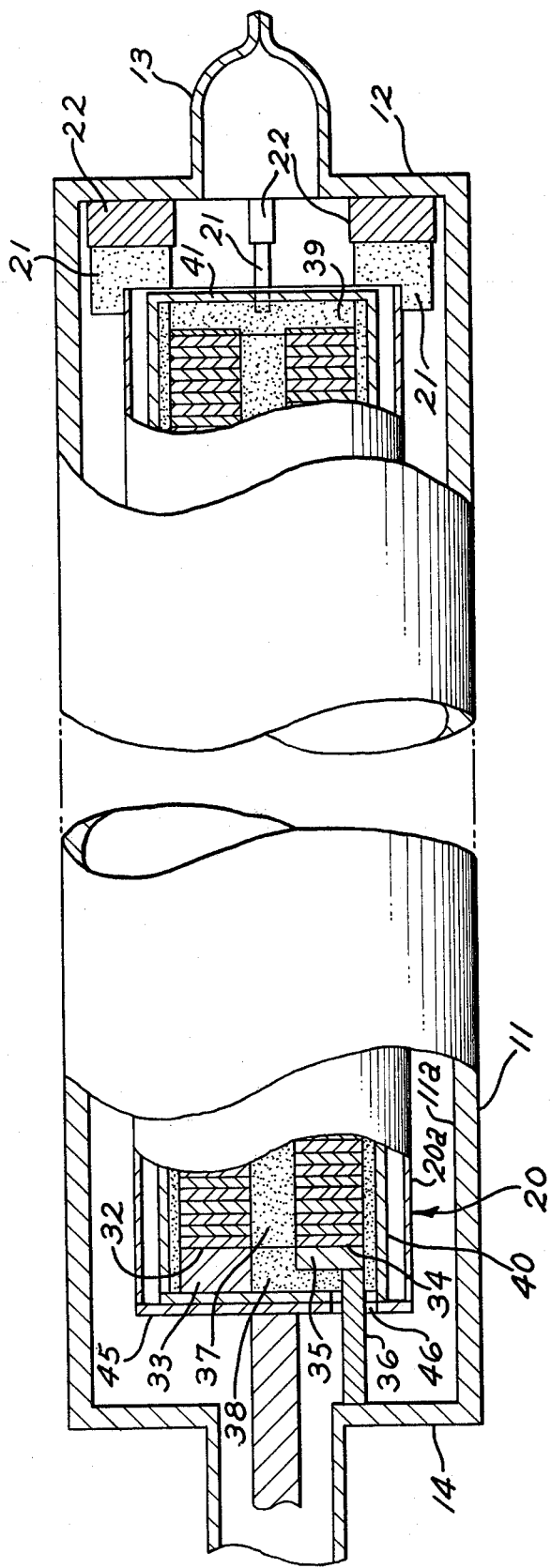
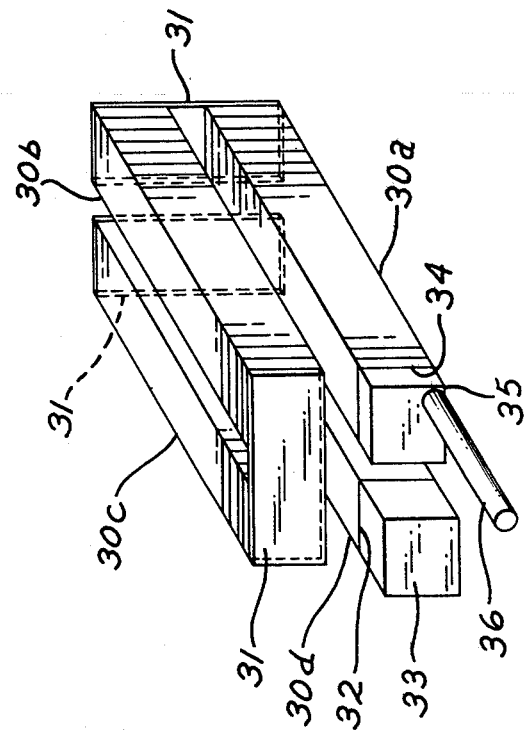
FIG. 2
FIG. 3

THERMIONIC-THERMOELECTRIC GENERATOR SYSTEM AND APPARATUS

BACKGROUND OF INVENTION

This invention relates to a combination thermionic-thermoelectric generator and more particularly to an apparatus and system which provides improved performance over prior known apparatus of this general type.

Thermionic and thermoelectric generators are well known in the art to be capable of generating electric currents by the application of heat to the devices. In the case of thermionic generators, current is created by the emission of electrons from a surface which has been heated sufficiently to allow the electron energy to overcome the potential barrier energy level of the surface. The basic theory of thermionic energy conversion is discussed in U.S. Pat. No. 2,980,819—Feaster issued Apr. 18, 1961. One difficulty known to exist with converters of this type is the relatively low usuable potential that can be developed unless a relatively large number of converters are cascaded in series with consequent increase in bulk and cost. Also, converters that give usuable current levels generally require extremely close interelectrode spacing between the emitters and collector electrodes, generally on the order of one millimeter. The difficulty in achieving and maintaining such close spacing, particularly at the high temperatures, e.g. 1200° C. required to have usable electron emission, has limited the commercial usefulness of thermionic converters to highly specialized applications.

Thermoelectric converters, comprising a series of thermocouples, are also well known. In this device a current is generated by electron flow at the interface between the abutting surfaces of dissimilar materials maintained at different temperatures. By cascading a large number of these thermocouples, a thermopile can be produced which generates usable potential levels limited, in general, only by the practical length of the thermopile.

In the past, a number of combined thermionic and thermoelectric generators have been proposed in which the two types of devices are packaged together and electrically connected at a common therminal so that the heat applied to the package causes both generators to develop current outputs, usually at separate output terminals. Examples of such devices are shown and described in U.S. Pat. Nos. 3,189,765 and 3,430,079 issued June 15, 1965, and Feb. 25, 1969, respectively.

Despite the prior art which exists in this technology, it is believed that heretofore there has not existed a small, compack thermionic-thermoelectric generator apparatus capable of producing usable levels of current at usable potential levels. It is an object of this invention to provide a system embodying the improved apparatus with suitable switching circuits to furnish electrical current at usable potential levels to a load impedance.

SUMMARY OF THE INVENTION

Thus in accordance with one aspect of the invention, there is provided thermionic-thermoelectric generator apparatus comprising a first elongated metallic cylindrical electrode having its internal surface coated with a thermionic electron emmissive material and a second elongated metallic cylindrical electrode nested coaxially within the first cylinder electrode, this second cylinder having at least the outer surface thereof coated with graphite to serve as a collector electrode for the electrons emitted from the first cylinder surface. Preferably the interelectrode spacing between the two cylinders is substantially uniform along the axial length thereof. The apparatus is further provided with a plurality of thermopiles nested within the second cylinder, the thermopiles being electrically connected in series with one end consisting of electron donor material electrically coupled to the first cylinder, the other end consisting of electron acceptor material being electrically coupled to the second or inner cylinder. Means, such as sealable vacuum fittings are provided by which the outer cylinder may be evacuated and the vacuum maintained in the interelectrode space between the two cylinders. Means are also provided, such as at the end of the cylinders opposite the vacuum fitting, to provide external electrical connections from the cylinder electrodes to a load circuit.

In the system of the invention, there is also included, with a pair of generators such as just described, circuit means for coupling in repetitive alternating sequence, each of the generators to output load terminals to provide a continuous electrical current flow to a load impedance connected to the load terminals.

BRIEF DESCRIPTION OF THE DRAWINGS

FIG. 2 is a side view in partial section showing the details of the apparatus of the invention.

FIG. 3 is a perspective view showing the thermopile construction used in the FIG. 2 apparatus.

DETAILED DESCRIPTION

Figure 1:
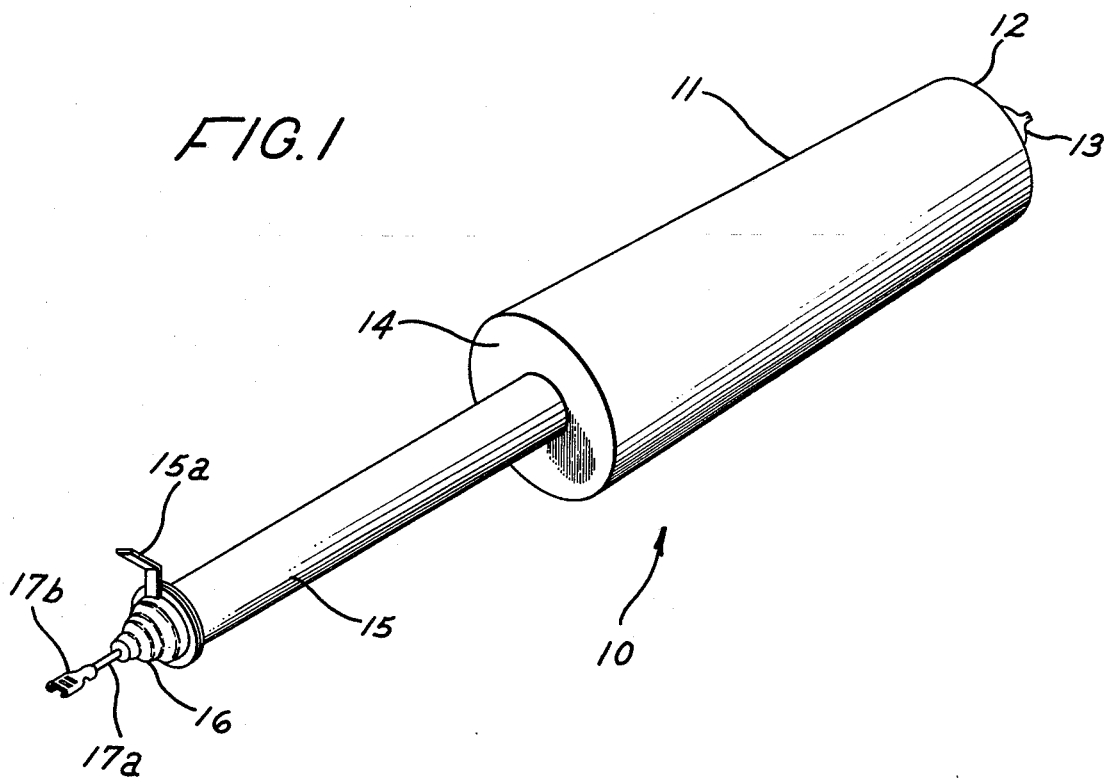
FIG. 1 is a general perspective view of the generator apparatus of the present invention.
Figure 5:
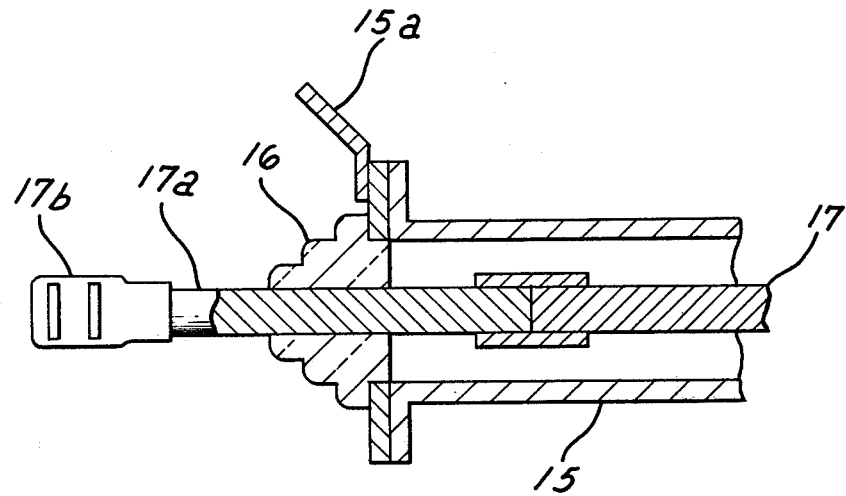
FIG. 5 is a cross-sectional side view showing details of the connection terminals for the FIG. 1 apparatus.

Referring jointly to FIGS. 1–5, the thermionic-thermoelectric generator apparatus 10 includes a first or outer cylinder 11, preferably of stainless steel, enclosed at one end by an end cap 12 and suitable vacuum fittings 13 and at the other end by an end cap 14 having an elongated output terminal electrode 15 sealed at the distal end by a ceramic seal and the extension 17a of interior terminal electrode 17. As best seen in FIG. 2, the generator apparatus comprises first outer cylinder 11 in which is nested, in coaxial manner, a second or inner cylinder 20, preferably also of stainless steel. As seen in the drawings, the righthand end of cylinder 20 is supported by four L-shaped aluminum oxide mounts 21 attached to stainless steel blocks 22 which in turn are secured in suitable manner to the interior face of end cap 12. The interior surface 11a of the outer cylinder 11 is coated in well known manner with a suitable thermionic electron emissive material such as a mixture of barium oxide, strontium oxide and calcium oxide, mixed in the ratio of 1:1:1 by weight. The outer surface 20a of inner cylinder 20 is coated in known manner with graphite to serve as a collector of electrons emitted from outer cylinder surface 11a.

Figure 4:
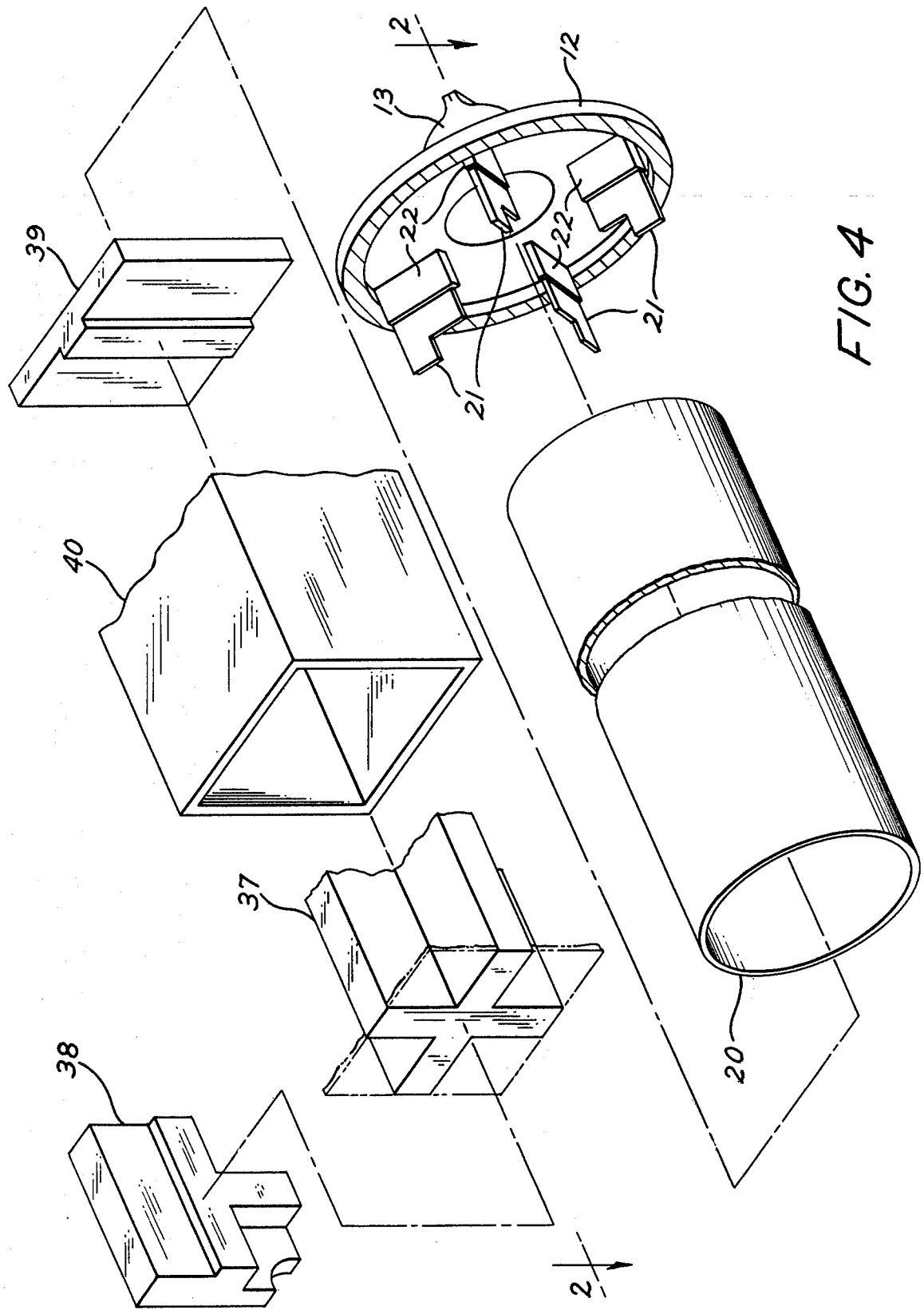
FIG. 4 is an exploded perspective view of the interior cylinder and thermopile support of the FIG. 2 apparatus.

Nested within inner cylinder 20 is a thermopile assembly best seen in FIGS. 3 and 4 and comprised of a plurality, in this case four, thermopile sections 30a, 30b, 30c, 30d, each of which consists of approximately 380 thermocouples formed of thin wafers of carbon and silicon carbide in alternating sequence. The sections are electrically connected in series by tungsten connectors 31. One end 32 of the thermopile series, formed of a wafer of the electron donor material silicon carbide is adhered to a stainless steel block 33. The other end 34 of the thermopile series formed of a wafer of electron acceptor material carbon is attached to a stainless steel block 35 to which is attached an electode rod 36 of stainless steel. The thermopile sections 30a–30d are positioned snugly within recesses of a ceramic extruded cruciform shaped insulator support 37 (best seen in FIG. 4) and thereafter the tungsten connectors 31 are attached. Ceramic end caps 38 and 39 are positioned at the ends of the cruciform thermocouple assembly and the entire assembly is then placed inside a ceramic housing 40 which is closed at one end 41. The housing 40 is then placed inside inner cylinder 20. Preferably, the cross-sectional diagonal dimension of housing 40 is the same as the inner diameter of cylinder 20 so that the housing is properly supported and held in place within cylinder 20. A stainless steel end cap 45 is placed over the end of housing 40 so as to touch thermopile terminal block 33 and secured to the end of inner cylinder 20 to provide electrical coupling between the end of the thermopile and cylinder 20. Electrode rod 36 extends through an opening 46 suitably provided in end cap 45 and touches end cap 14 of outer cylinder 11 so as to provide electrical electrical coupling from the other end of the thermopile 30 to the outer cylinder 11 which comprises the cathode of the generator.

An elongated electrically conductive stainless steel rod 17 extends axially outward from inner cylinder end cap 45 and serves as the positive connection for the generator. Rod 17 extends concentrically through an outer tube 15 and secured by a suitable collar fitting to extension rod 17a which projects through ceramic seal fitting 16. Rod 17a ends in a terminal connector 17b which serves as the positive terminal of the generator 10 while tube 15 ends with an electrical connector 15a which serves as the negative terminal of the generator 10.

In an actually constructed and operated device, the length of cylinder 11 is 22 inches long and 4 inches in outer diameter. The inner cylinder 20 is 16 inches in length and 3 inches in diameter. Both cylinders are made of stainless steel, the inner cylinder 20 being 16 gauge while outer cylinder 11 is 0.237 inches thick. The thermopile consists of 380 junctions of silicon carbide and carbon. Any suitable heat source capable of heating the generator to temperatures of 400°–450° C. may be used to operate the generator.

Figure 6:
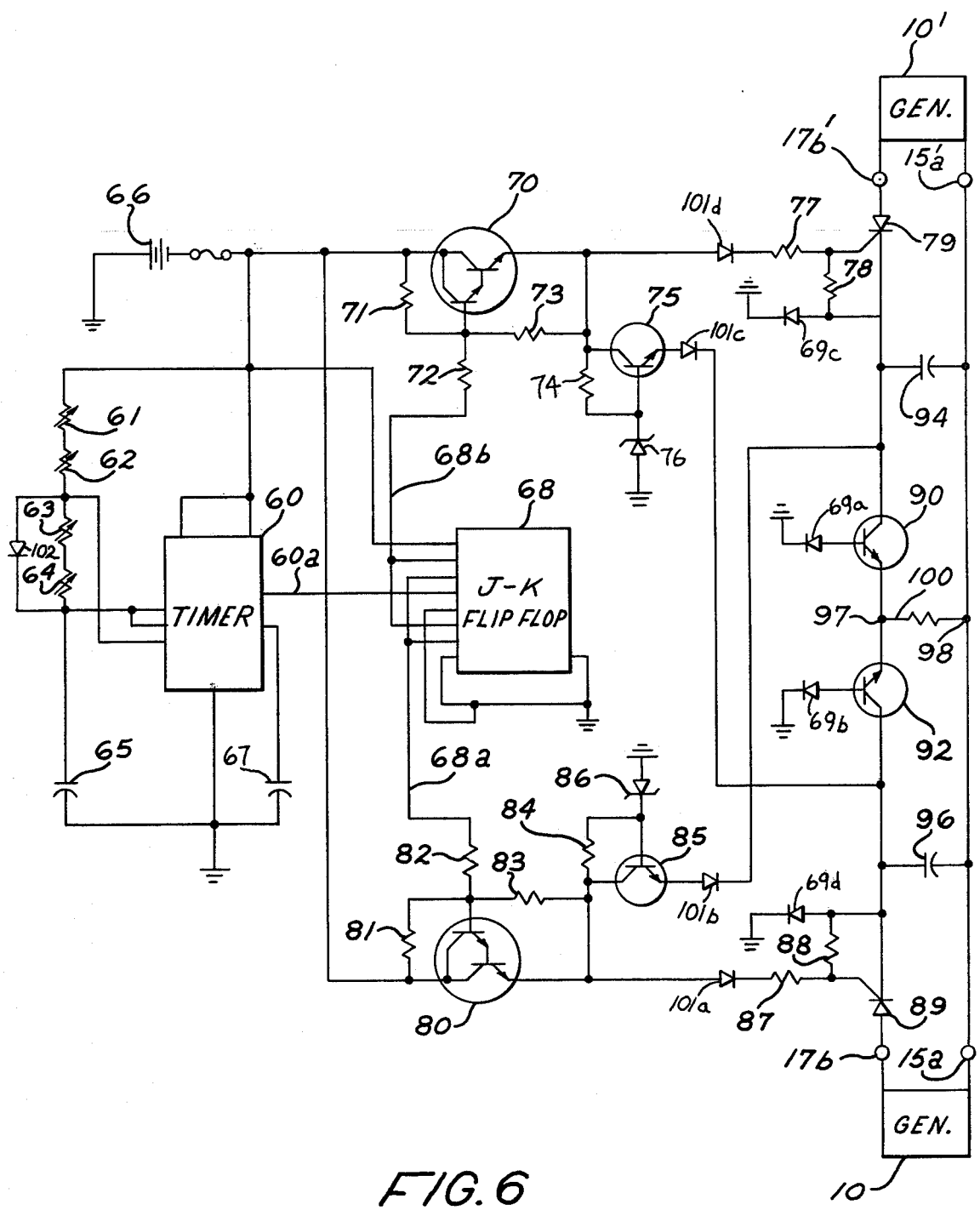
FIG. 6 is a schematic circuit diagram illustrating a timing and current switching circuit useful in one form of the present invention.

Referring now to FIG. 6, a suitable switching and control circuit is shown for use in a system of the invention utilizing a pair of the thermionic-thermoelectric generators 10 and 10' as described above. Thus, the circuit of FIG. 6 includes a timer circuit 60 of the well known 555 integrated circuit type operated in the astable mode at a frequency of, for example, 400 Hz., as determined principally by the value of resistors 61–64 and the value of capacitor 65. The output of timer 60 is coupled by line 60a to the input of J-K flip-flop 68 to cause the output states on line 68a and 68b to reverse at the aforementioned 400 Hz. rate. A pair of Darlington connected transistors 70 and 80 are alternately biased into conduction by flip-flop 68 causing SCR 79 and 89, respectively, to be triggered into conduction. When, for example, SCR 89 is conducting, the current output of generator 10 is coupled to charging capacitor 96. At this time, SCR 79 is off and charging capacitor 94 is isolated from generator 10'.

The circuit further includes transistors 75 and 85, the outputs of which are cross-coupled to opposite branches of the balanced switching circuit including SCR 79 and current transistor 90 in one branch and SCR 89 and current transistor 92 in the other branch. In this manner, when Darlington transistor 80 has triggered SCR 89 into conduction to couple generator 10 to charging capacitor 96, the output of transistor 85 causes transistor 90 to conduct resulting in coupling of current from previously charged capacitor 94 to output terminals 87, 98 and through load 100. When flip-flop 68 switches state, the sequence is reversed and generator 10' is coupled to charging capacitor 94 through SCR 79 and transistor 92 is pulled into conduction to couple charging capacitor 96 to output terminals 97, 98 and load 100.

By way of example and without limitation thereto, the following circuit values were used in an actually constructed embodiment of the invention, viz:

| | |
|---|---|
| Resistors 78, 88 | 100 Ohms, 1 W. |
| Resistors 77, 87 | 27 Ohms, 1 W. |
| Resistors 74, 84 | 470 Ohms |
| Resistors 73, 83 | 39K Ohms |
| Resistors 72, 82 | 8K Ohms |
| Resistors 71, 81 | 1 Megohm |
| Resistors 61, 63 | 1 Megohm |
| Resistors 62, 64 | 10K Ohms |
| Capacitors 94, 96 | GE Dielektrol, 25KVAR 240 g |
| Capacitor 67 | .01 mf |
| Capacitor 65 | 1.0 mf |
| Transistors 90, 92 | GE ZJ-499 |
| Transistors 75, 85 | GED40D8 |
| Darlington Transistors 70, 80 | ECG 268 |
| Diodes 69a, b, c and d | 1R5333A |
| Diodes 101a, b, c and d | 1R350 |
| Diode 102 | 1N914 |
| Zener Diodes 76, 86 | 2.5v, 1W - ECG 5062A |
| SCR 79, 89 | GE C230C |
| Flip-flop 68 | 4027 Cos/Mos - Dual J-K (Radio Shack) |
| Timer 60 | 555 (Radio Shack) |
| $V_{bb}66$ | 12 v. |

With generator apparatus 10 as described, it will be appreciated that the generator system of the invention is compact and efficient in operation. Using the thermopile nested within the inner cylinder 20 to operate from the same heat source as used for the thermionic converter stage to apply a positive potential to the collector cylinder 20 allows greater interelectrode spacing to be used between cylinders 11 and 20 and provides high currents at usable potential levels. For example, with the generator system as described, currents of 200 amps at 108 volts are possible when the generators are heated only to 400°–450° C., assuming 380 thermocouple junctions in each of the thermopile sections 30a–30d. Since the system is compact, portable and requires low temperatures available from conventional heat sources to operate, it can be installed for use in, for example, electrically powered vehicles without the limitations associated with electric storage batteries. It can also readily be used as a source of electric power for residential purposes of as a back-up power source for emergency facilities such as hospitals.

While there has been described what at present is believed to be one preferred embodiment of the invention, it will be appreciated that modifications therein can be made by those skilled in the art without departing from the spirit of the invention and it is intended that all such modifications are to be covered as are within the scope of the appended claims.

It is claimed:

1. Thermionic-thermoelectric generator system comprising:

a pair of thermionic-thermoelectric generator apparatus, each including a pair of axially aligned and concentric metal electrode cylinders closed at both ends to form an enclosed and evacuated space therein, at least the inner surface of the outer cylinder being coated with a thermionic electron emissive material to form a cathode and at least the facing surface of the inner cylinder being coated with graphite to form an anode, and including a thermopile series nested within the inner cylinder, the positive end of the series being electrically coupled to the anode, the negative end of the series being electrically coupled to the cathode, the generator apparatus further including external positive and negative terminals coupled to the anode and cathode, respectively;

a pair of output terminals adapted to be coupled to a load impedance;

and circuit means for alternately coupling each of the generator apparatus to the output terminals to provide a continuous electric current flow to the load impedance, said circuit means comprising a pair of charging capacitors, a first pair of controlled current switching devices, each connecting a generator apparatus to a respective charging capacitor, a second pair of current switching devices, each connecting a charging capacitor to the output terminals of the system, and timing control circuits for operating the current switches in sequentially alternations so that, as one generator is coupled to its charging capacitor, the other generator is uncoupled from its charging capacitor, and during this time the charging capacitor of the other generator is coupled to the output terminals while the charging capacitor of the one generator is uncoupled from the output terminals, the timing circuits being adapted to periodically reverse this sequence of connections.

2. The system of claim 1 in which the thermionic electron emission material comprises a mixture of barium oxide, calcium oxide and strontium oxide in the ratio of about 1:1:1 by weight.

3. The system of claim 1 in which the thermopiles comprise an alternating series of wafers of silicon carbide and carbon with the silicon carbide wafer at one end of the series connected thermopiles being electrically coupled to the inner cylinder to form the positive terminal of the generator apparatus and the carbon wafer at the other end of the series connected apparatus being electrically coupled to the outer cylinder to form the negative terminal of the apparatus.

4. The system of claim 1 which the outer cylinder is provided at one end with an end cap having sealable vacuum connections and, on the interior thereof, a plurality of heat resistant mounting means for holding the end of the inner cylinder fixed in position relative to the outer cylinder.

5. The system of claim 4 in which the outer cylinder is provided at the other end with an end cap and an elongated tube both being electrically conductive and electrically coupled to the outer cylinder and the thermopile to form the negative terminal of the generator apparatus, and the end of the inner cylinder adjacent the negative terminal end of the first cylinder being provided with an end cap and an elongated rod projecting concentrically through said tube, the end cap and rod combination being electrically conductive and electrically coupled to the inner cylinder and thermopile to form the positive terminal of the generator apparatus, the remote end of the rod being held in position within the tube by means of an electrically and thermally insulative seal to maintain the vacuum within the apparatus.

6. The system of claim 5 in which the thermopiles comprise four thermopile sections electrically connected in series by tungsten terminals and folded back on each other to form a compact thermopile series within the inner cylinder, and in which an electrically insulative heat resistant thermopile support means is provided in the inner cylinder, the support means being shaped to hold the thermopile sections fixed in place relative to the inner cylinder and electrically insulated therefrom along the axial length of the inner cylinder.

7. The system of claim 5 in which the interelectrode spacing between the outer and inner cylinder facing surfaces is at least about two centimeters.

* * * * *